(12) United States Patent
Kipping et al.

(10) Patent No.: US 7,966,815 B2
(45) Date of Patent: Jun. 28, 2011

(54) ENGINE LOAD ESTIMATION

(75) Inventors: Steven Richard Kipping, Conventry (GB); Toyoji Yagi, Conventry (GB)

(73) Assignee: Denso Corporation, Kariya (JP)

( * ) Notice: Subject to any disclaimer, the term of this patent is extended or adjusted under 35 U.S.C. 154(b) by 458 days.

(21) Appl. No.: 11/898,847

(22) Filed: Sep. 17, 2007

(65) Prior Publication Data
US 2009/0071152 A1   Mar. 19, 2009

(51) Int. Cl.
*F02B 33/44* (2006.01)
*F02B 33/00* (2006.01)

(52) U.S. Cl. ....... 60/605.1; 60/611; 123/559.1; 123/561

(58) Field of Classification Search ............. 60/611, 60/605.1; 123/561, 559.1; 701/101, 104
See application file for complete search history.

(56) References Cited

U.S. PATENT DOCUMENTS

| | | | |
|---|---|---|---|
| 4,995,347 A * | 2/1991 | Tate et al. ............. | 123/559.1 |
| 5,611,303 A | 3/1997 | Izuo | |
| 6,095,127 A * | 8/2000 | Kolmanovsky et al. ...... | 701/104 |
| 6,256,992 B1 * | 7/2001 | Lewis et al. .................. | 60/611 |
| 6,435,147 B1 | 8/2002 | Eichenseher et al. | |
| 6,497,214 B2 | 12/2002 | Yagi | |
| 6,508,233 B1 * | 1/2003 | Suhre et al. .................. | 123/478 |
| 6,662,640 B2 | 12/2003 | Yagi | |
| 6,715,287 B1 | 4/2004 | Engel et al. | |
| 6,779,344 B2 * | 8/2004 | Hartman et al. ............. | 60/600 |
| 6,983,597 B2 * | 1/2006 | Wild et al. .................. | 60/611 |
| 7,021,255 B2 | 4/2006 | Degner et al. | |
| 7,438,061 B2 * | 10/2008 | Wang et al. ................ | 123/559.1 |
| 2010/0131212 A1 * | 5/2010 | Heinkele et al. .......... | 73/114.33 |

FOREIGN PATENT DOCUMENTS

| | | |
|---|---|---|
| JP | 2002-130042 | 5/2002 |
| JP | 2002-201998 | 7/2002 |
| JP | 2002256907 | 9/2002 |
| WO | WO 01/48363 | 7/2001 |

OTHER PUBLICATIONS

Picron, V., Postel, Y.; "Electro-Magnetic Valve Actuation System: Functional characteristics and benefits"; SIA Conference on Variable Valve Actuation; Nov. 30, 2006; pp. 1-10.

* cited by examiner

*Primary Examiner* — Thai Ba Trieu
(74) *Attorney, Agent, or Firm* — Nixon & Vanderhye P.C.

(57) ABSTRACT

Engine load for a supercharged engine is estimated by determining airflow upstream of a throttle valve that is upstream of a supercharger, subtracting a value representative of a change in air mass between the throttle valve and the supercharger based on a measured change in pressure between the throttle valve and the supercharger, and subtracting a modification value dependent upon a current engine speed and a signal representative of a pressure at the intake manifold.

3 Claims, 5 Drawing Sheets

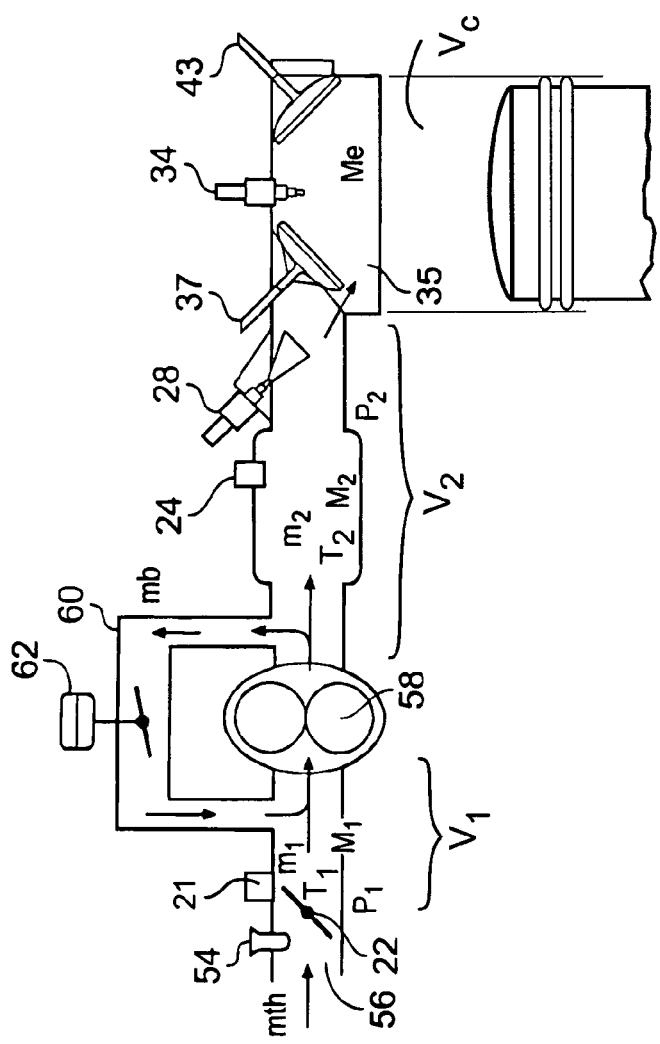
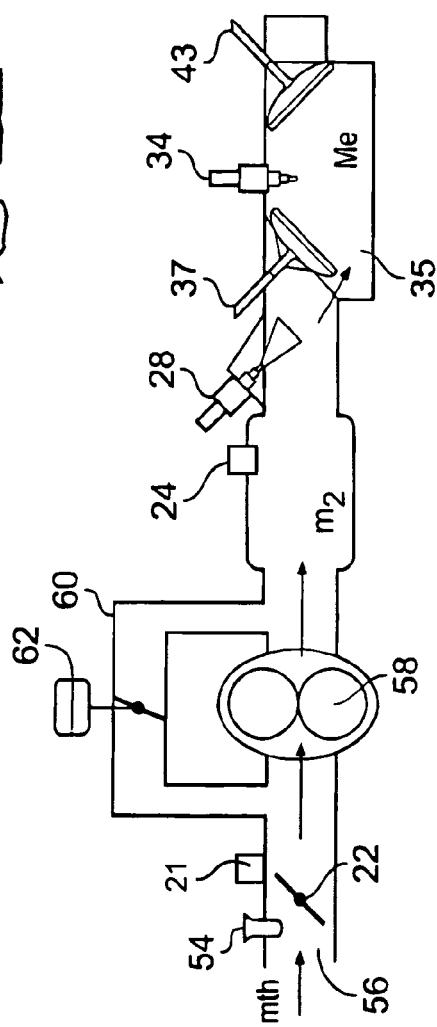
Fig. 2
Fig. 3

ENGINE LOAD ESTIMATION

BACKGROUND

1. Field

Non-limiting example embodiments of the present invention relate to engine load estimation for an internal combustion engine. Engine load can be represented by a change in air mass at an inlet manifold of an internal combustion engine.

2. Related Art

In a modern engine, an amount of fuel to be injected into a cylinder in a given cycle for a given lambda value is related to the air mass for the cycle at an intake manifold for the cylinder. In a normally aspirated engine, the air mass at the intake manifold is in turn related to the airflow at the throttle. However, in a supercharged engine provided with a supercharger bypass path, the airmass available is also dependent on whether the supercharger bypass path is open or not. Typically, the bypass valve, which may for example be in the form of a butterfly valve, is controlled based on inlet manifold pressure, and a particular timing of the opening and closing of the bypass value may not readily be determined.

Air mass measurement sensors are known, but they typically react relatively slowly. Accordingly, direct measurement of air mass at an intake manifold may not be able to act sufficiently quickly in a dynamic engine operating environment.

Accordingly, there is a need for a mechanism for estimating changes in air mass at an inlet manifold.

SUMMARY

An embodiment of the invention provides a method of estimating engine load on a supercharged engine by determining a change in air mass at an inlet manifold of the supercharged engine.

An embodiment of the invention can provide an engine management system for a supercharged internal combustion engine that is operable, in order to determine a change in air mass at an inlet manifold of the supercharged engine, to receive a value representative of an airflow upstream of a throttle valve that is upstream of a supercharger, to subtracting a value representative of a change in air mass between the throttle valve and the supercharger based on a measured change in pressure between the throttle valve and the supercharger; and to subtract a modification value dependent upon a current engine speed and a signal representative of a pressure at the intake manifold.

A supercharged internal combustion engine that includes an inlet manifold, a supercharger upstream of the inlet manifold, a throttle valve upstream of the supercharger, an airflow sensor upstream of the throttle valve, a pressure sensor between the throttle valve and the supercharger, an engine speed sensor and a sensor providing a signal representative of a pressure at an intake manifold can be provided with such an engine management system.

An embodiment of the invention can thus provide a method determining a change in air mass at an inlet manifold of a supercharged engine including determining airflow upstream of a throttle valve that is upstream of a supercharger, subtracting a value representative of a change in air mass between the throttle valve and the supercharger based on a measured change in pressure between the throttle valve and the supercharger; and subtracting a modification value dependent upon a current engine speed and a signal representative of a pressure at the intake manifold.

An embodiment of the invention can enable an estimation of engine load both when a bypass path for the supercharger is open and when it is closed without needing to calculate the airflow though the bypass path.

BRIEF DESCRIPTION OF THE DRAWINGS

Specific embodiments of the present invention will now be described by way of example only with reference to the accompanying drawings.

FIG. 2 is a schematic representation of an air intake system including a supercharger with a bypass path open;

FIG. 3 is a schematic representation of an air intake system including a supercharger with a bypass path closed;

Figure 1:
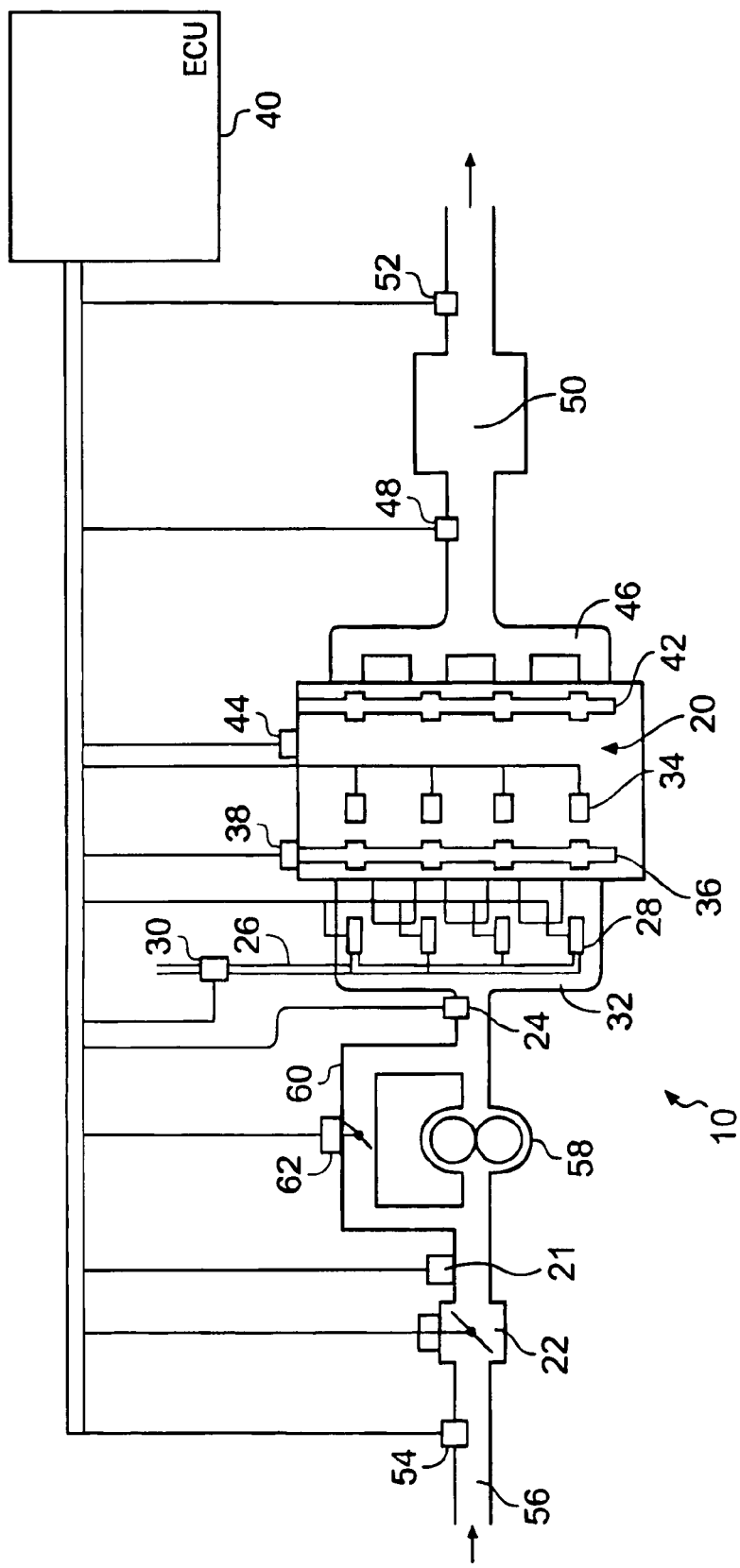
FIG. 1 is a schematic overview of a supercharged internal combustion engine system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

An embodiment of the invention can estimate the engine load in terms of the airflow into an engine using sensor information. Knowing the correct amount of air, or more specifically oxygen, available for each combustion event can facilitate achieving a controlled air-fuel mixture. Correct load estimation is also important for ignition control.

The engine control unit (ECU) of an internal combustion engine can be responsive to user input (for example through an accelerator position) to determine the user's desired engine load in a given situation. Logical elements in the ECU can respond to input parameters to determine factors such as an amount of fuelling and ignition timings to achieve the desired engine load.

An embodiment of the invention can facilitate accurate estimation of the airflow into the engine over a wide range of operation conductions in order correctly to be able dynamically to calculate the fuel amount and ignition angle.

An embodiment of the invention enables an estimation of the engine load for a supercharged internal combustion engine without calculating airflow though a bypass path. The engine load is represented by a change in air mass at an inlet manifold of the supercharged engine. This is estimated by determining airflow upstream of a throttle valve that is upstream of a supercharger, subtracting a value representative of a change in air mass between the throttle valve and the supercharger based on a measured change in pressure between the throttle valve and the supercharger and subtracting a modification value dependent upon a current engine speed and a signal representative of a pressure at the intake manifold.

In the following the computation of the load on a supercharged engine will be described. FIG. 1 is a schematic representation of an engine system 10 including a supercharged internal combustion engine 20. The internal combustion engine 20 represented in FIG. 1 is a four cylinder gasoline engine. The engine system is controlled by an engine control unit (ECU) 40 which is connected to various sensors and control subsystems of the engine system 10. The ECU controls the operation of a throttle 22 at the intake side of the engine. A fuel injector 28 for each cylinder is provided in the inlet manifold 32 and is connected to a fuel supply line 26. A pressure regulator 30 is used to control fuel pressure in the fuel supply line 26 and the individual injectors 28 receive control signals from the ECU to control the timed injection of fuel. Spark plugs 34 receive ignition timing (IGT) signals from the ECU 40.

The engine control unit 40 receives signals from camshaft sensor 38 and a crankshaft sensor 44 indicating the timing of the rotation of intake camshaft 36 and the engine crankshaft (not shown), respectively. In addition, an exhaust camshaft sensor may be provided for the exhaust camshaft 42. The intake and exhaust camshafts 36 and 42 respectively control intake and exhaust valves (37 and 43—see FIGS. 2 and 3). The engine control unit 40 also receives control signals from universal exhaust gas oxygen (UEGO) sensor 48 and a heated exhaust gas oxygen (HEGO) sensor 52, either side of a catalytic converter 50, downstream of the exhaust manifold 46. It should be noted that the HEGO sensor 52 could, in other examples, be located between separate converter blocks within a catalytic converter assembly, rather than after the catalytic converter 50.

Also shown in FIG. 1 is a Mass Air Flow Sensor (MAF) sensor 54 in the air intake path 56 upstream of the throttle 22. This MAF sensor 54 provides mass air flow signals from the air intake path to the ECU 40. A manifold absolute pressure (MAP) sensor 24 in the intake manifold 32 provides manifold absolute pressure signals to the ECU.

A supercharger, or compressor, 58 is provided in the air inlet path downstream of the throttle valve 22 and upstream of the inlet manifold 32. A supercharger bypass path 60 provided and the flow of air though this path is controlled by a bypass valve 62.

Different operating conditions of the supercharger are described with reference to FIGS. 2 and 3. The behavior of the system varies depending on whether the bypass valve 62 is open or closed. When the bypass valve 62 is open, the supercharger 58 boost effect is reduced by the air backflow through the bypass path, or pipe 60, whereby the engine will behave similarly to a normally aspirated engine. When the bypass valve 62 is closed, the supercharger 58 will build up additional pressure in the intake manifold 32. As the system behavior is different when bypass valve 62 is open compared with when the bypass valve 62 is closed, separate equations can be used to describe each type of operation, as will be described with reference to FIGS. 2 and 3. FIG. 2 illustrates operation of the supercharger with the bypass valve open and FIG. 3 illustrates operation of the supercharger with the bypass valve closed.

As represented in FIG. 2, the supercharger 58 is located upstream of the inlet manifold 32 and the throttle valve 22 is located upstream of the supercharger 58 in the direction of airflow into the engine. The MAP sensor 24 is provided in the region of the inlet manifold 32. Air is drawn in at 56, upstream of the throttle valve 22. The MAF sensor 54 is located in the air flow path upstream of the throttle valve 22. As shown in FIG. 2, the supercharged engine is in a non-boost condition with the bypass valve 62 open so that air can be drawn through the bypass path 60.

In the following description of FIGS. 2 and 3, various parameters are referred to. These are described below:

i. $M_1$: Air mass in upstream supercharger/downstream throttle
ii. $M_2$: Air mass downstream of the supercharger 58
iii. $M_e$: Air mass in cylinder
iv. $M_{th}$: Air mass flow through throttle 22 (g/s)
v. $m_1$: Air mass flow into the supercharger 58 (g/s)
vi. $m_b$: Air mass flow through the bypass path 60 (g/s)
vii. $m_2$: Air mass flow out from the supercharger 58 (g/s)
viii. $P_1$: Absolute pressure upstream of supercharger/downstream of throttle
ix. $P_2$: Absolute pressure downstream of supercharger 58
x. ne: Engine speed (rev/s)
xi. $V_1$: Volume upstream of the supercharger/downstream of the throttle
xii. $V_2$: Volume downstream of supercharger
xiii. $VC_c$: Volume (displacement) of a cylinder 35
xiv. R: Gas constant
xv. $T_1$: Mass air temperature upstream of the supercharger/downstream of the throttle
xvi. $T_2$: Mass air temperature downstream of the supercharger
xvii. K: A number defining a change in manifold pressure-based load In the situation shown in FIG. 2, the rate of change of the air mass (that is the air mass balance) upstream of the supercharger can be represented as:

$$\dot{M}_1 = m_{th} - m_1 + m_b \tag{1}$$

i. or $$m_1 - m_b = m_{th} - \dot{M}_1 \tag{2}$$

The rate of change of the air mass (that is the air mass balance) downstream of the supercharger can be represented as $$\dot{M}_2 = m_2 - m_b + ne \cdot M_e \tag{3}$$

If it is assumed that $m_1 = m_2$, then the air mass balance downstream of the supercharger in the situation shown in FIG. 2 can be represented as $$\dot{M}_2 = m_{th} - \dot{M}_1 + ne \cdot M_e \tag{4}$$

As represented in FIG. 3, the configuration is as shown in FIG. 2, except that the supercharged engine is in a boost condition with the bypass valve 62 closed so that air cannot be drawn through the bypass path 60.

In the situation shown in FIG. 3, the rate of change of the air mass (that is the air mass balance) upstream of the supercharger can be represented as:

$$\dot{M}_1 = m_{th} - m_1 \tag{5}$$

i. or $$m_1 = m_{th} - \dot{M}_1 \tag{6}$$

The rate of change of the air mass (that is the air mass balance) downstream of the supercharger can be represented as $$\dot{M}_2 = m_2 + ne \cdot M_e \tag{7}$$

If it is assumed that $m_1 = m_2$, then the air mass balance downstream of the supercharger in the situation shown in FIG. 3 can be represented as:

$$\dot{M}_2 = m_{th} - \dot{M}_1 + ne \cdot M_e \tag{8}$$

It would be desirable to have a single equation that can represent the air mass balance downstream of the supercharger, that is for the inlet manifold, in both the situation shown in FIG. 2 and the situation shown in FIG. 3. The equation that is used should be based on operating parameters that can be measured reliably and quickly.

It is to be noted that the rate of change in the air mass (the air mass balance) at the various locations in the airflow path, $M_1$, $M_2$ and $M_e$, can also be represented by the following equations:

$$\dot{M}_1 = \frac{V_1}{RT_1} P_1 \quad (9)$$

$$\dot{M}_2 = \frac{V_2}{RT_2} P_2 \quad (10)$$

$$\dot{M}_e = \frac{V_e}{RT_2} P_2 = KP_2 \quad (11)$$

Comparing the equations 4 and 8, and taking into account the relationships 9, 10 and 11, the following common equation can be derived:

$$\frac{V_2}{RT_2} \dot{P}_2 - m_{th} - \frac{V_1}{RT_1} \dot{P}_1 - ne \cdot K \cdot P_2 \quad (12)$$

This equation can be solved through the predetermination of the relationship between the rate of change of pressure upstream of the supercharger $\dot{P}_1$ and the rate of change of pressure downstream of the supercharger $\dot{P}_2$ for the operating conditions of the engine.

Figure 4:
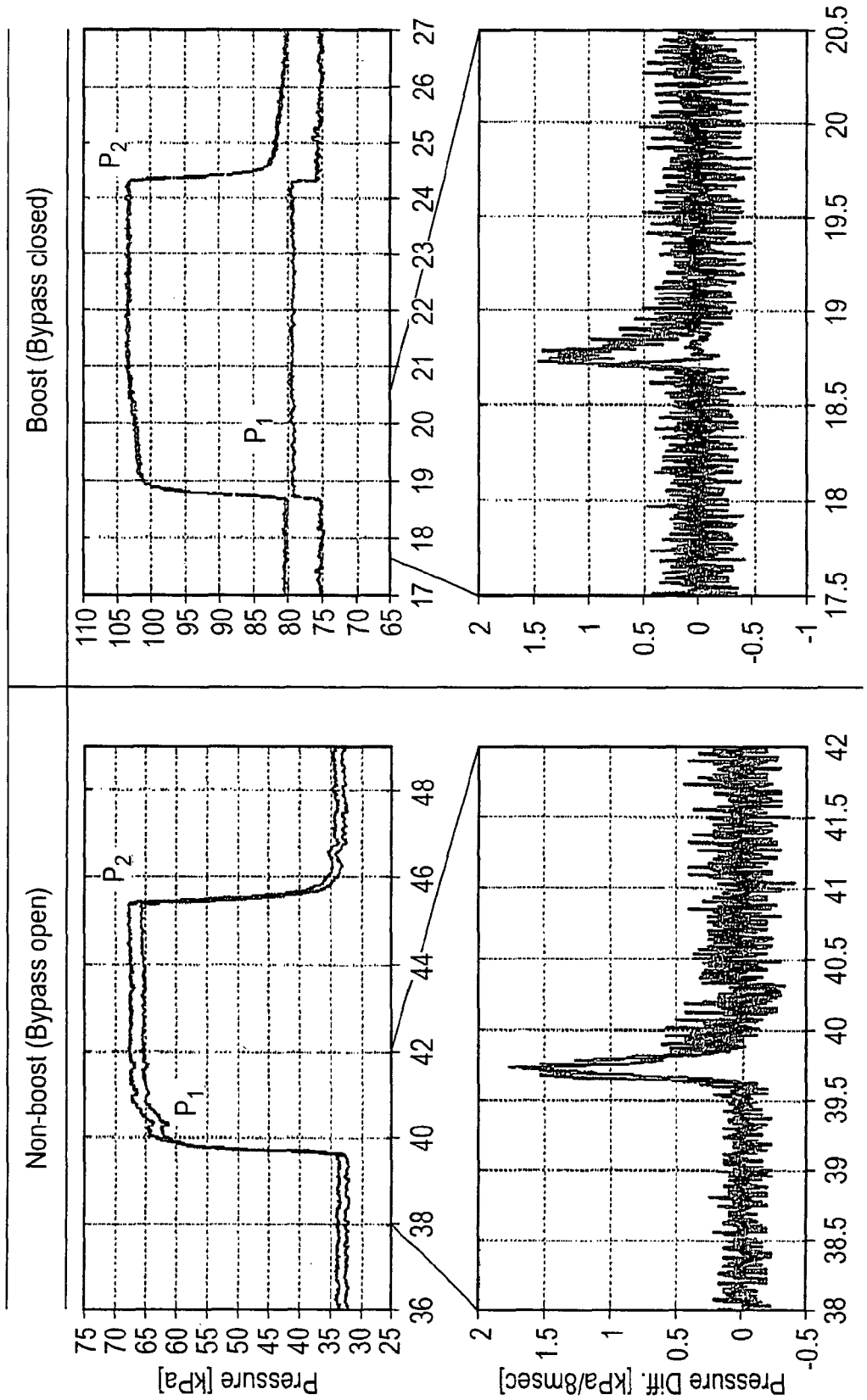
FIG. 4 represents relationships between various operating parameters.

FIG. 4 represents the relationship between $\dot{P}_1$ and $\dot{P}_2$ for the non-boost and boost situations:

In the non-boost example with the bypass open, the transient result shows:

$$\dot{P}_2 = \dot{P}_1 \quad (13)$$

In comparison thereto, in the boost example with the bypass closed, the transient result shows:

$$\dot{P}_2 = \frac{a}{1+s} \dot{P}_1 \quad (14)$$

Which can be approximated to $$\dot{P}_2 = a\dot{P}_1 \quad (15)$$

Thus, it can be concluded that $\dot{P}_2$ can be solved by modifying equation 12:

$$\frac{V_2}{RT_2} \dot{P}_2 = m_{th} - \frac{V_1}{RT_1} \frac{\dot{P}_2}{a} - ne \cdot K \cdot P_2 \quad (16)$$

Figure 5:
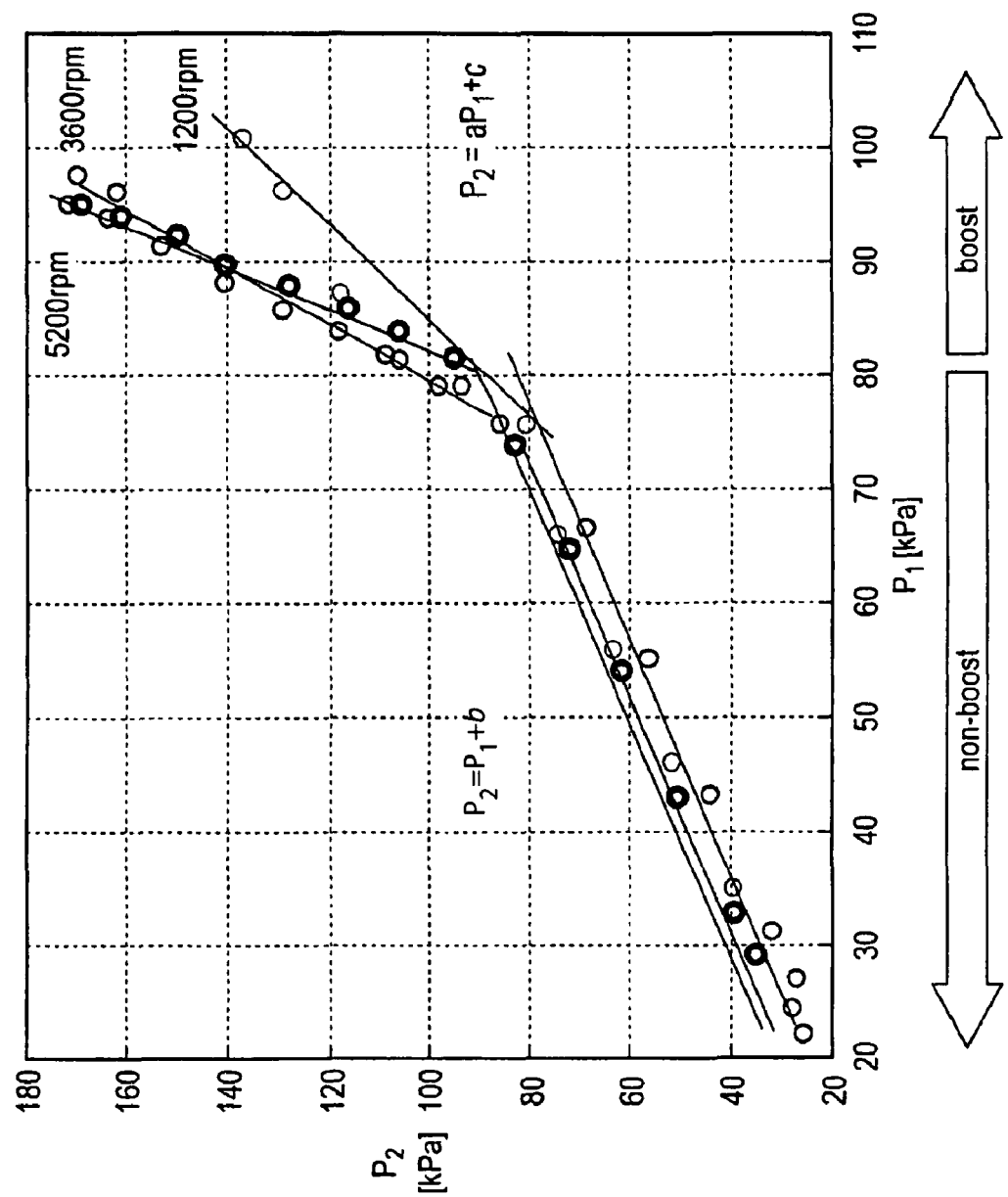
FIG. 5 represents a mapping between various parameters in non-boost and boost conditions of a supercharger.

FIG. 5 illustrates the computation of the relationship between $\dot{P}_1$ and $\dot{P}_2$ with measurement results at steady state. Further measurements can be determined at other dynamic conditions, and these can then be combined in a mapping for different engine speeds.

Figure 6:
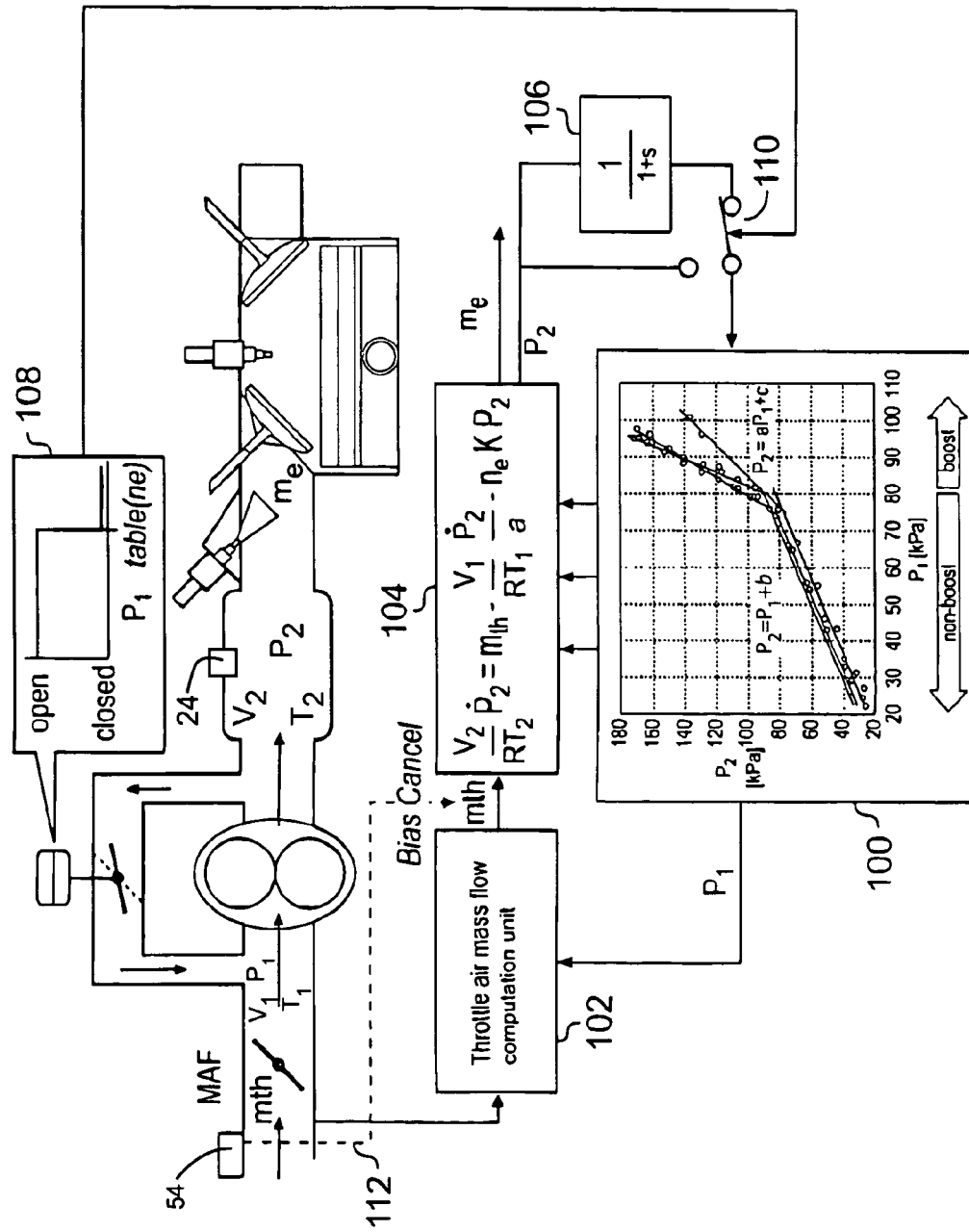
FIG. 6 is a schematic representation of logical elements of an embodiment of the invention.

FIG. 6 is a schematic block diagram illustrating part of the logic of the engine control unit (ECU) 40 shown in FIG. 1, for computing the engine load in terms of a change in air mass $m_e$ at the inlet manifold.

FIG. 6 illustrates an engine map unit 100 that contains mappings predetermined from measured values, as represented, for example in FIG. 5. The engine map unit 100 receives as an input an engine speed parameter ne, determined by the ECU 40 from, for example, a cam or crank sensor. The engine map unit 100 also received as input a value from switch 110, to be described later. The engine map unit 100 can be operable to determine a value for the Pressure $P_1$ that it provides to a throttle air mass flow computation unit 102 that also received input form the air mass sensor 54. The throttle air mass flow computation unit 102 is operable to generate a throttle air mass flow value $m_{th}$ representative of an air mass flow that passes through the throttle 22 shown in FIG. 1, which throttle air mass flow value $m_{th}$ is supplied to an inlet manifold air mass flow computation unit 104. The inlet manifold air mass flow computation unit 104 employs equation 16 to estimate the air mass $m_e$ flow at the inlet manifold 32 for a cylinder for which combustion is to be performed. The inlet manifold air mass flow computation unit 104 is responsive not only to the air mass flow value $m_{th}$ from the throttle air mass flow computation unit 102, but also to values, including the value of a, from the engine map unit 100.

As well as outputting the value of the air mass flow $m_e$, the engine load computation unit 104 also outputs a value representative of an estimation of the absolute pressure $P_2$ downstream of the supercharger 58. This value forms the input to the engine map unit 100 from the switch 110 in a non-boost condition when the bypass valve 62 is open. In other words, in the non-boost condition when the bypass valve 62 is open, the switch 110 is in the position that causes the $P_2$ value to be passed directly to the engine map unit 100. However, when the bypass valve is closed bypass valve logic 108 sends a signal to cause the switch to the position shown in FIG. 6, wherein the $P_2$ value is passed via the arithmetic logic unit 106, which multiplies the $P_2$ value by $1/(1+s)$, where "$1/(1+s)$" represents a first order filter.

Optionally, the throttle air mass flow value $m_{th}$ computed by the throttle air mass flow computation unit 102 can be modified by a bias value based on calibration of the MAF sensor 54 as represented by the dashed line 112.

Further logical elements (not shown) in the engine control unit (ECU) 40, which further logical control units can be implemented in a conventional manner, can be operable to use a change in the computed charged mass airflow $m_e$ as representative of the charged mass airflow from the inlet manifold to the cylinder in which a combustion event is to occur to calculate fuelling using the injector for the cylinder concerned and ignition timings using the spark plug for the cylinder concerned to achieve efficient combustion in accordance with a user's required engine load.

In an example embodiment of the invention, therefore, a change in air mass at an inlet manifold of a supercharged engine is determined using equation 16 by: determining an airflow upstream of a throttle valve that is upstream of a supercharger; subtracting a value representative of a change in air mass between the throttle valve and the supercharger based on a measured change in pressure between the throttle valve and the supercharger by a pressure sensor 21 (see FIGS. 1-3); and subtracting a modification value dependent upon a current engine speed and a signal representative of a pressure at the intake manifold.

The value representative of a change in air mass between the throttle valve and the supercharger can be computed as $dP_1 * (V_1/RT_1)$, where $dP_1$ (i.e.: $\dot{P}_1$) is the measured change in pressure between the throttle value and the supercharger, $V_1$ is the volume at the throttle, R is a gas constant for air, and $T_1$ is a temperature at the throttle.

The modification value can be computed as $ne * KdT * P_2$, where ne is a measured engine speed, K is a variable constant and $P_2$ is a pressure at the inlet manifold.

In one example embodiment of the invention, the logic described in FIG. 6 forms part of the engine control unit 40 of FIG. 1. The logic can be implemented as hard-wired logic within the engine control unit (ECU) 40, in for example, one or more integrated circuits. Alternatively, it can be implemented at least in part by software that is operable to control one or more ECU processors. The engine map logic can also be implemented in the form of data held in memory, for example persistent memory such as programmable read only memory. The programmable read only memory can, for example be electrically erasable and/or rewritable. The memory can be integral to or separate from other logical units represented in FIG. 6.

Accordingly, there has been described a method and apparatus for estimating engine load for a supercharged internal combustion engine by determining engine airflow upstream of a throttle valve that is upstream of a supercharger, subtracting a value representative of a change in air mass between the throttle valve and the supercharger based on a measured change in pressure between the throttle valve and the supercharger and subtracting a modification value dependent upon a current engine speed and a signal representative of a pressure at the intake manifold.

Example embodiments have been described in the context of a four cylinder internal combustion engine. However, it will be appreciated that the invention is also applicable to any other engine configuration, by way of example only, to engines with six or eight cylinders arranged in one or more banks of cylinders.

Indeed, although the embodiments above have been described in considerable detail, numerous variations and modifications will become apparent to those skilled in the art once the above disclosure is fully appreciated. It is intended that the following claims be interpreted to embrace all such variations and modifications as well as their equivalents.

What is claimed is:

1. A method of determining a change in air mass at an inlet manifold of a supercharged internal combustion engine comprising:
   measuring airflow upstream of a throttle valve that is upstream of a supercharger;
   subtracting, using a processing unit having one or more computer processors, from the measured airflow, a value representative of a change in the air mass between the throttle valve and the supercharger based on a change in pressure between the throttle valve and the supercharger; and
   subtracting, using the processing unit, from the measured airflow, a modification value dependent upon a current engine speed and a signal representative of a pressure at the inlet manifold;
   wherein the value representative of a change in the air mass between the throttle valve and the supercharger is computed as:
   $dP_1*(V_1/RT_1)$, where
   $dP_1$ is the change in pressure between the throttle value and the supercharger,
   $V_1$ is the volume at the throttle,
   R is a gas constant for air, and
   $T_1$ is a temperature at the throttle
   wherein the modification value is computed as:
   $ne*KdT*P_2$, where
   ne is a measured engine speed,
   K represents a number defining a change in manifold pressure load; and
   $P_2$ is a pressure at the inlet manifold.

2. A supercharged internal combustion engine comprising:
   an inlet manifold;
   a supercharger upstream of the inlet manifold;
   a throttle valve upstream of the supercharger;
   an airflow-sensor upstream of the throttle valve;
   a pressure sensor between the throttle valve and the supercharger;
   an engine speed sensor;
   a sensor providing a signal representative of a pressure at the inlet manifold; and
   an engine management system operable, in order to determine a change in air mass at the inlet manifold:
   to receive, at a processing unit having one or more computer processors, a value from the airflow sensor representative of airflow upstream of the throttle valve;
   to subtract, using the processing unit, from the received value, a value representative of a change in the air mass between the throttle valve and the supercharger based on a change in a pressure signal from the pressure sensor between the throttle valve and the supercharger; and
   to subtract, using the processing unit, from the received value, a modification value dependent upon a current engine speed measured by the engine speed sensor and the signal representative of the pressure at the inlet manifold to determine the change in the air mass at the inlet manifold;
   wherein the value representative of a change in the air mass between the throttle valve and the supercharger is computed as:
   $dP_1*(V_1/RT_1)$, where
   $dP_1$ is the change in pressure between the throttle value and the supercharger,
   $V_1$ is the volume at the throttle,
   R is a gas constant for air, and
   $T_1$ is a temperature at the throttle
   wherein the modification value is computed as:
   $ne*K*P_2$, where
   ne is a measured engine speed,
   K represents a number defining a change in manifold pressure load; and
   $P_2$ is a pressure at the inlet manifold.

3. An engine management system for a supercharged internal combustion engine, the engine management system being operable, in order to determine a change in air mass at an inlet manifold of a supercharged engine:
   to receive, at a processing unit having one or more computer processors, a value representative of airflow upstream of a throttle valve that is upstream of a supercharger;
   to subtract, using the processing unit, from the received value, a value representative of a change in the air mass between the throttle valve and the supercharger based on a change in pressure between the throttle valve and the supercharger; and
   to subtract, using the processing unit, from the received value, a modification value dependent upon a current engine speed and a signal representative of a pressure at the inlet manifold to determine the change in the air mass at the inlet manifold of the supercharged engine;
   wherein the value representative of a change in the air mass between the throttle valve and the supercharger is computed as:
   $dP_1*(V_1/RT_1)$, where
   $dP_1$ is the change in pressure between the throttle value and the supercharger,
   $V_1$ is the volume at the throttle,
   R is a gas constant for air, and
   $T_1$ is a temperature at the throttle; and
   wherein the modification value is computed as:
   $ne*K*P_2$, where
   ne is a measured engine speed,
   K represents a number defining a change in manifold pressure load; and
   $P_2$ is a pressure at the inlet manifold.

* * * * *